(12) United States Patent  (10) Patent No.: US 6,527,414 B2
Moon  (45) Date of Patent: Mar. 4, 2003

(54) BACKLIGHT DEVICE

(75) Inventor: Jeong Min Moon, Kyonggi-do (KR)

(73) Assignee: LG.Philips LCD Co., LTD, Seoul (KR)

( * ) Notice: Subject to any disclaimer, the term of this patent is extended or adjusted under 35 U.S.C. 154(b) by 0 days.

(21) Appl. No.: 10/108,908

(22) Filed: Mar. 29, 2002

(65) Prior Publication Data

US 2002/0141183 A1 Oct. 3, 2002

(30) Foreign Application Priority Data

Mar. 29, 2001 (KR) .................................. 2001-16475
Jul. 19, 2001 (KR) .................................. 2001-43385

(51) Int. Cl.[7] ............................................. F21Y 113/00
(52) U.S. Cl. .......................... 362/249; 362/225; 362/33
(58) Field of Search ................................ 362/249, 217, 362/223, 225, 33, 362

(56) References Cited

U.S. PATENT DOCUMENTS 4,184,194 A * 1/1980 Shofu ........................... 362/97
6,126,297 A * 10/2000 Matsui et al. ................ 362/231
6,331,064 B1 * 12/2001 Nishiyama et al. ......... 362/260
6,491,411 B2 * 10/2002 Itoh ............................. 362/246

* cited by examiner

Primary Examiner—Laura K. Tso
(74) Attorney, Agent, or Firm—Morgan, Lewis & Bockius LLP

(57) ABSTRACT

A backlight device includes a plurality of light emitting lamps, a plurality of upper and lower holders each having a plurality of recesses for receiving the plurality of light emitting lamps, a plurality of conductive layers for supplying power to the light emitting lamps, and light diffusion means disposed over the plurality of upper holders.

24 Claims, 17 Drawing Sheets

BACKLIGHT DEVICE

This application claims the benefit of the Korean Application Nos. P2001-16475 filed in Korea on Mar. 29, 2001, and P2001-43385 filed in Korea on Jul. 19, 2001, which are hereby incorporated by reference.

BACKGROUND OF THE INVENTION

1. Field of the Invention

The present invention relates to a backlight device, and more particularly, to a backlight device for a liquid crystal display.

2. Background of the Related Art

In general, liquid crystal display (LCD) devices are used as display screens in a wide variety of applications including notebook computers, monitors, space crafts, and aircraft, for example. Presently, thin profile LCD devices have a display screen of not more than a few centimeters.

Currently, LCD devices use a backlight device as a light source that is disposed on a rear portion of an LCD panel. In general, the backlight device is a cylindrical fluorescent lamp usually arranged as one of a beneath-type or a light plate-type. However, the backlight device is not efficient in consideration of thickness, weight, and power consumption.

The beneath-type backlight device is limited in its fabrication since a gap must be maintained between the lamp and the LCD panel to provide of a light diffusing means for uniform distribution of light. Moreover, as the size of display panels increases, an increase in a light emission surface area of the backlight device is required. Accordingly, if a relatively large beneath-type backlight device is fabricated, the light emission surface may not be uniformly smooth to provide the light diffusing means of an adequate thickness.

The light plate-type backlight device includes the fluorescent lamp disposed along a circumference thereof, and a light plate is used for diffusing the light emitted from the fluorescent lamp. Since the fluorescent lamp is disposed along a circumference of the light plate-type backlight device, the amount of light transmitted through the light plate is low. Accordingly, expensive optical design and fabrication technologies are required for the light plate-type backlight device in order to provide uniform distribution of light.

Accordingly, the beneath-type and light plate-type backlight devices each have their own unique disadvantages. The beneath-type backlight device is commonly used in LCD devices, wherein display brightness is more important than a thickness of the display screen. The light plate-type backlight device is commonly used in portable LCD devices, wherein a thickness of the display screen is more important than display brightness.

FIG. 1 shows a perspective view of a related art beneath-type backlight device for an LCD according to the related art, and FIG. 2 shows a power line connected between a light emission lamp and a connector according to the related art. In FIG. 1, the backlight device is provided with a plurality of light emitting lamps 1, an outside case 3 for fastening and holding the light emitting lamps 1, optical diffusing means 5a, 5b, and 5c arranged between the light emitting lamps 1 and the LCD panel (not shown), and a reflecting plate 7. The reflecting plate 7 is disposed on an inside surface of the outside case 3 for focusing the light emitted from the light emitting lamp 1 onto a display part of the LCD panel, thereby increasing a light utilization efficiency. The backlight device includes the optical diffusing means 5a, 5b, or 5c for preventing portions of the light emitting lamp from being displayed on a display surface of the LCD panel, thereby providing a light source having a uniform light distribution.

In FIG. 2, the light emitting lamp 1, commonly referred to as a cold cathode fluorescent lamp (CCFL), has electrodes 2 and 2a disposed at opposing ends inside of a fluorescent tube for emitting light when a power is applied to the electrodes. Both ends of the light emitting lamp 1 are inserted into recesses formed along opposing surfaces of the outside case 3. The light emitting lamp 1 includes power lines 9 and 9a that each include a first end connected to the electrodes 2 and 2a of the light emitting lamp 1 and a second end connected to a separate connector 11 that is connected to a driving circuit (not shown). The power lines 9 and 9a are bent to a lower part of the outside case 3 and connected to the connector 11.

However, the backlight device according to the related art has a complicated wiring scheme since the connector that connects the power line to a driving circuit is required for every light emitting lamp. Accordingly, since the power lines are bent and must be individually connected to the connector, fabrication efficiency is decreased. Moreover, since each of the power lines must be inserted into a through hole in the outside case, fabrication efficiency is decreased and any future maintenance of the light emitting lamp is time consuming and costly.

SUMMARY OF THE INVENTION

Accordingly, the present invention is directed to a backlight device that substantially obviates one or more of the problems due to limitations and disadvantages of the related art.

An object of the present invention is to provide a backlight device that increases working efficiency and fabrication productivity, and can be easily maintained.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight device includes a plurality of light emitting lamps, a plurality of upper and lower holders each having a plurality of recesses for receiving the plurality of light emitting lamps, a plurality of conductive layers for supplying power to the light emitting lamps, and light diffusion means disposed over the plurality of upper holders.

In another aspect, a backlight device includes a plurality of light emitting lamps, each of the lamps having a first length corresponding to opposing end portions of the light emitting lamps, a plurality of lower holders arranged at a first distance away from each other corresponding to approximately the first length, each of the plurality of lower holders having a plurality of recesses for receiving lower surfaces of the opposing end portions of the plurality of light emitting lamps, a plurality of upper holders arranged at the first distance away from each other, each of the plurality of upper holders having a plurality of recesses for receiving upper surfaces of the opposing end portions of the plurality of light emitting lamps, and a plurality of conductive layers formed on opposing surfaces of each of the plurality of lower and upper holders for supplying power to the plurality of light emitting lamps.

In another aspect, a backlight device includes a plurality of light emitting lamps, each of the lamps having a first length corresponding to opposing end portions of the light emitting lamps, a plurality of lower holders arranged at a first distance away from each other corresponding to approximately the first length, each of the plurality of lower holders having a plurality of recesses for receiving lower surfaces of the opposing end portions of the plurality of light emitting lamps, a plurality of lower supporting parts formed between the plurality of lower holders for supporting the plurality of lower holders, a plurality of upper holders arranged at the first distance away from each other, each of the plurality of upper holders having a plurality of recesses for receiving upper surfaces of the opposing end portions of the plurality of light emitting lamps, and a plurality of conductive layers formed on opposing surfaces of each of the plurality of lower and upper holders for supplying power to the plurality of light emitting lamps.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
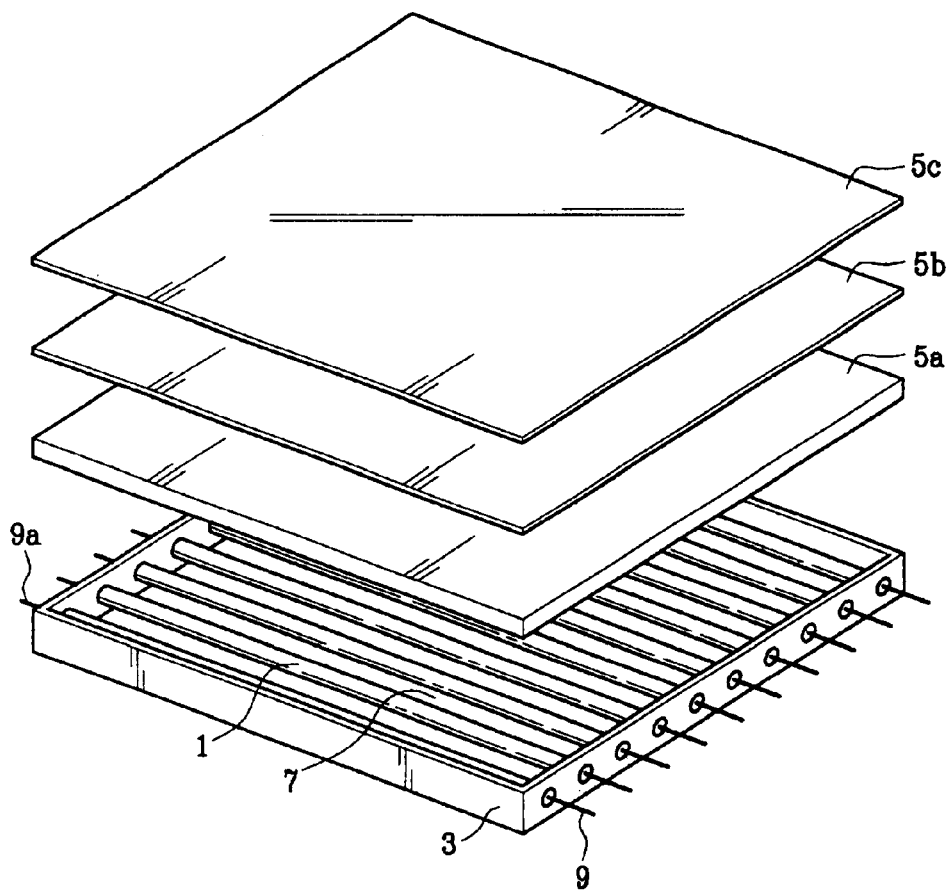
FIG. 1 shows a perspective view of a beneath-type backlight device according to the related art.
Figure 2:
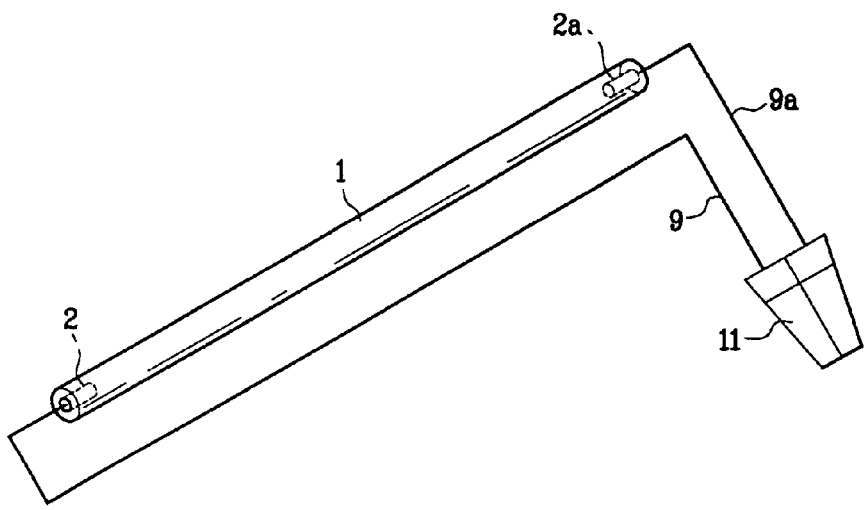
FIG. 2 shows power lines connected between a light emitting lamp and a connector according to the related art.
Figure 3A:
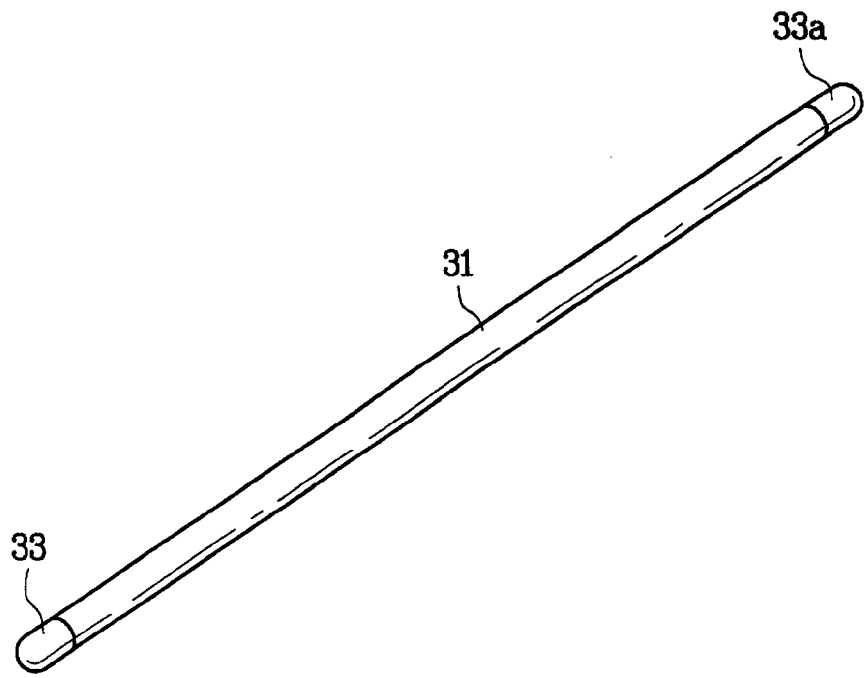
FIGS. 3A and 3B show exemplary light emitting lamps according to the present invention.
Figure 3B:
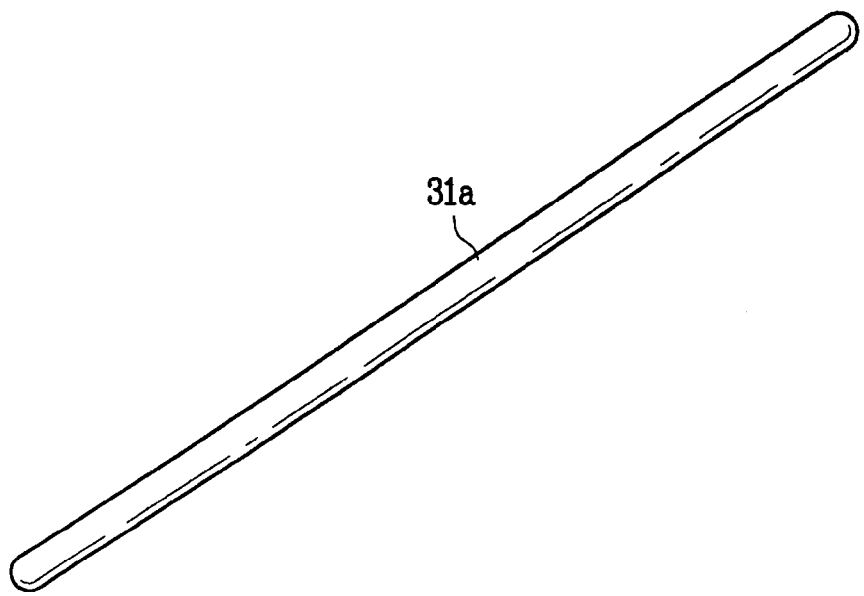

FIGS. 3A and 3B show exemplary light emitting lamps according to the present invention. In FIG. 3A, a light emitting lamp 31 may include electrodes 33 and 33a formed on outer surfaces at opposing end portions. In FIG. 3B, an electrodeless light emitting lamp 31a is shown.

Figure 4A:
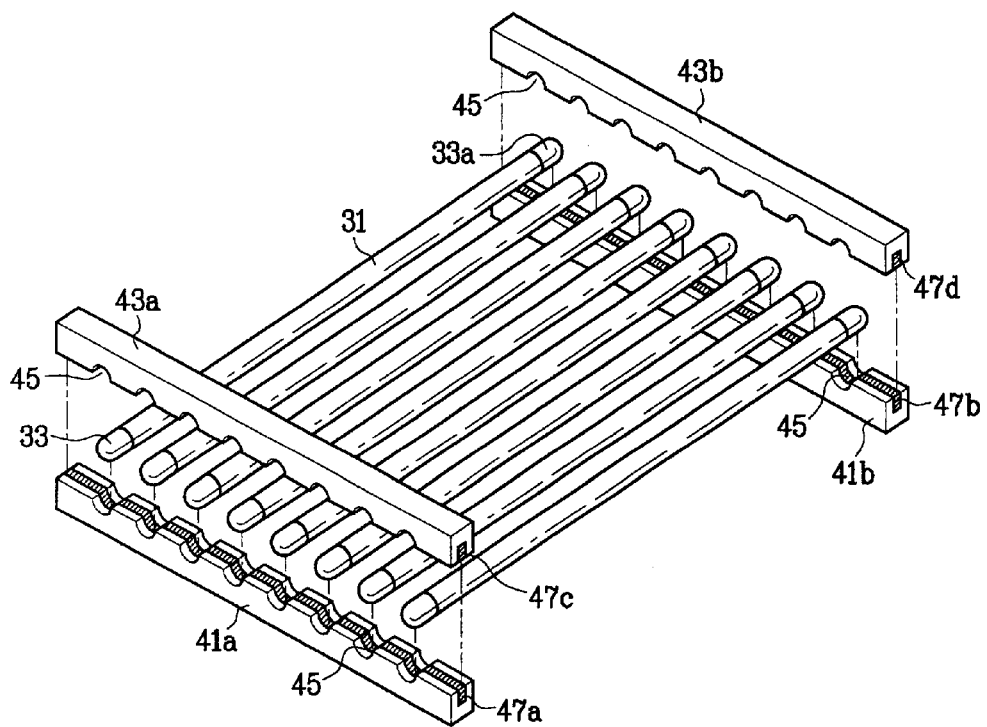
FIGS. 4A and 4B show perspective views of exemplary backlight devices according to the present invention.
Figure 4B:
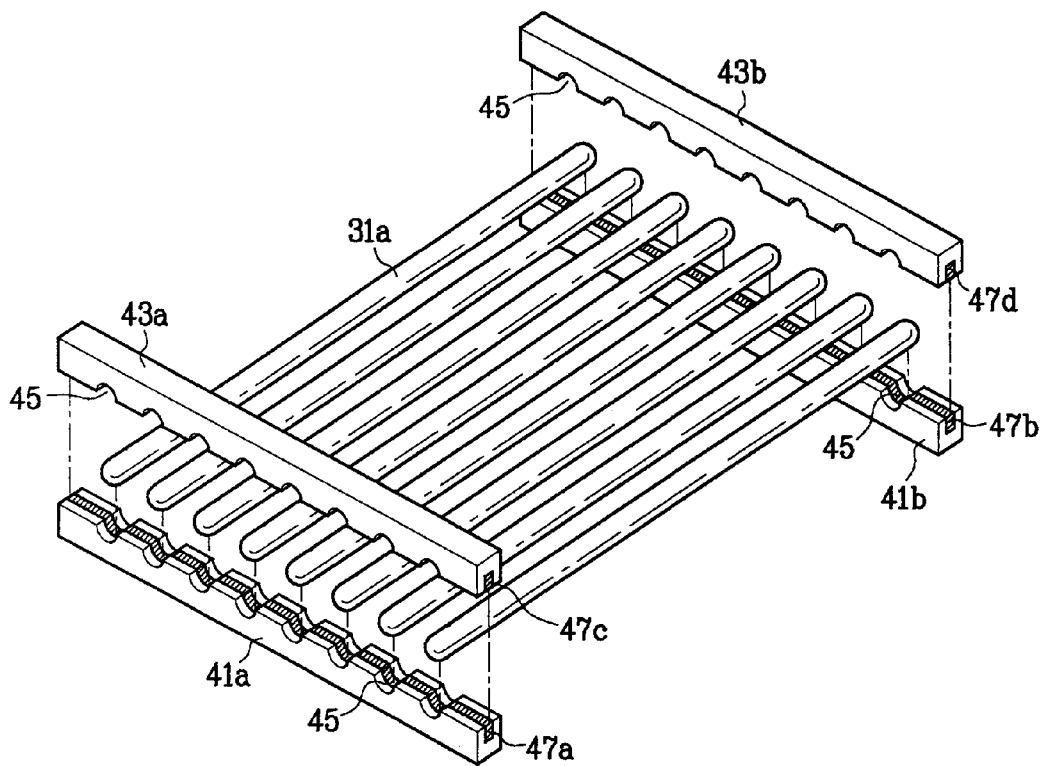

FIGS. 4A and 4B show perspective views of exemplary backlight devices according to the present invention. In FIG. 4A, the backlight device may include a plurality of light emitting lamps 31 each having electrodes 33 and 33a formed on outer surfaces at opposing ends portions, first and second lower holders 41a and 41b spaced apart by a distance to conform to a length of the light emitting lamps 31 each having a plurality of recesses 45 formed in a surface thereof for receiving opposing ends of the plurality of light emitting lamps 31, first and second upper holders 43a and 43b spaced apart by the distance associated with the first and the second lower holders 41a and 41b and including the recesses 45 associated with the first and the second lower holders 41a and 41b for fastening and holding the light emitting lamps 31 in association with the first and second lower holders 41a and 41b, and conductive layers 47a, 47b, 47c, and 47d formed on surfaces within the recesses 45 are formed in the holders 41a, 41b, 43a, and 43b, for supplying power to the electrodes 33 and 33a of the light emitting lamps 31.

The recesses 45 may be formed to fully pass through each of the first and second upper and lower holders 41a, 41b, 43a, and 43b when the light emitting lamps 31 are held between the first and second lower holders 41a and 41b and the first and second upper holders 43a and 43b. Each of the opposing ends of the light emitting lamps 31 may protrude from an outermost surface of each of the first and second upper and lower holders 41a, 41b, 43a, and 43b. Each of the recesses may be formed in a size to fit to an outside shape of the light emitting lamps 31, such that the first and second lower holders 41a and 41b accept a lower one-half of a diameter of the light emitting lamps 3 and the upper holders 43a and 43b accept an upper one-half of the diameter of the light emitting lamps 31.

The conductive layers 47a, 47b, 47c, or 47d may be formed by inserting or coating, for example, a conductive material in a groove formed along a length direction of each of the first and second upper and lower holders 41a, 41b, 43a, and 43b within each of the recesses 45.

One of the electrodes 33 of the light emitting lamps 31 may be connected to the conductive layers 47a and 47c on opposite surfaces of the first lower holder 41a and the first upper holder 43a, and the other electrode 33a of the light emitting lamps 31 may be connected to the conductive layers 47b and 47d on opposite surfaces of the second lower holder 41b and the second upper holder 43b.

In FIG. 4B, the conductive layers 47a, 47b, 47c, and 47d may be formed on opposing surfaces of the holders 41a, 41b, 43a, and 43b to serve as electrodes for providing power to the electrodeless light emitting lamps 31a.

Figure 4C:
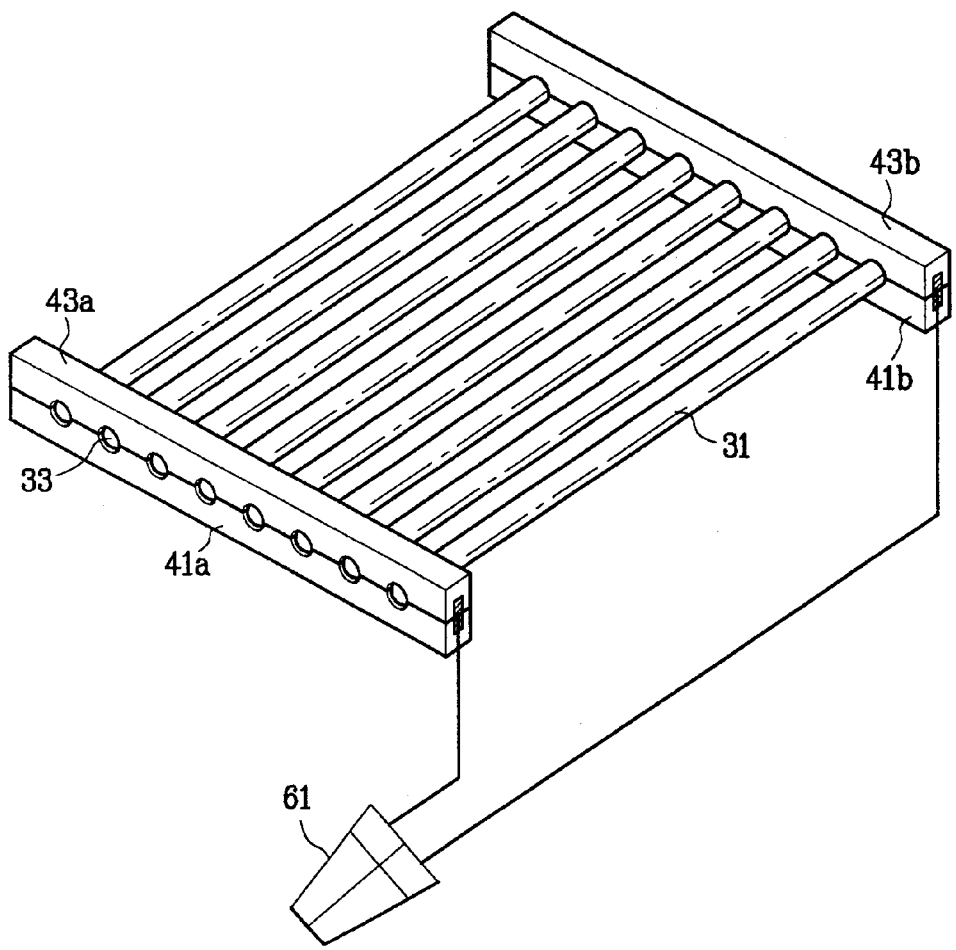
FIG. 4C shows a perspective view of an exemplary backlight device according to the present invention.

FIG. 4C shows a perspective view of an exemplary backlight device according to the present invention. In FIG. 4C, the backlight device may be connected to a driving circuit through at least one connector that may be connected to the conductive layers 47a, 47b, 47c, and 47d. Accordingly, a total number of connectors in the backlight device according to the present invention may be significantly reduced as compared to the backlight device according to the related art, thereby simplifying wiring to the driving circuit and increasing a working efficiency of the backlight device.

Although not shown, a light diffusing means, such as a diffusion sheet or diffusion plate, for example, may be disposed over the first and second upper holders 43a and 43b for uniform distribution of light onto a surface of the display of the LCD panel.

Figure 5A:
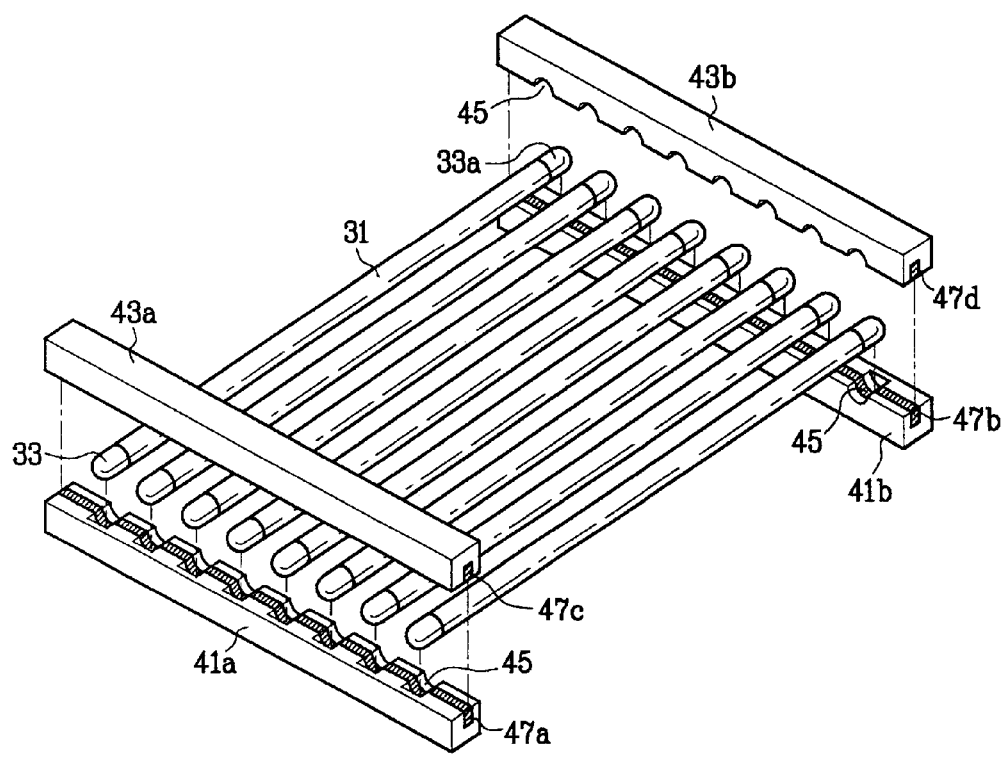
FIGS. 5A and 5B show perspective views of exemplary backlight devices according to the present invention.
Figure 5B:
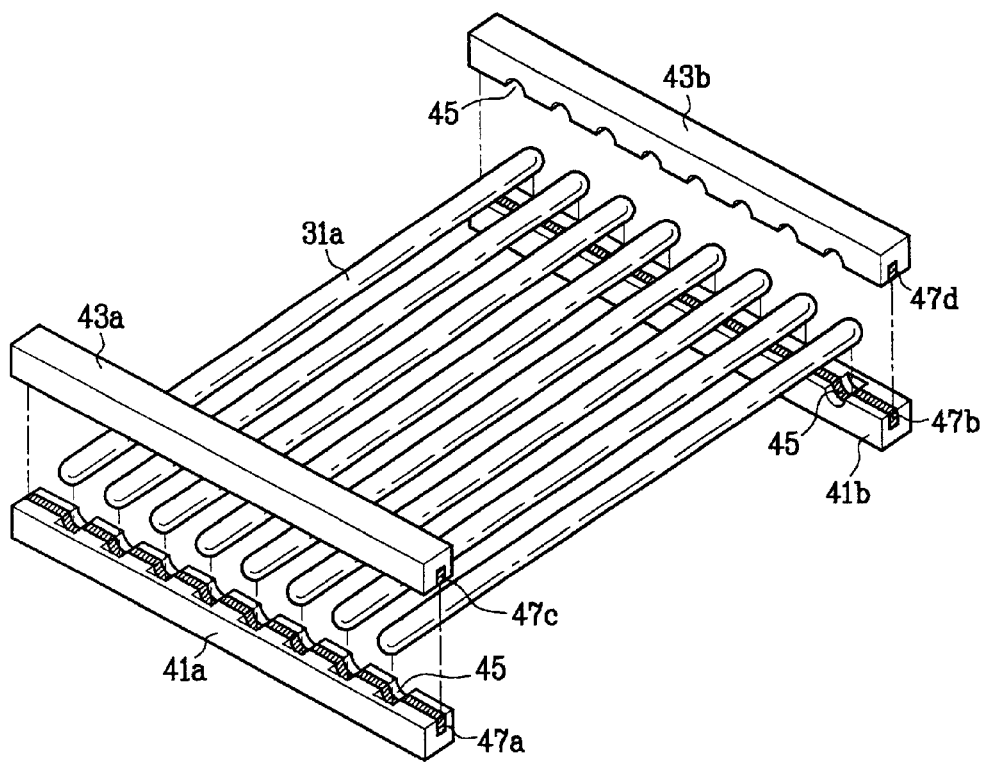
Figure 5C:
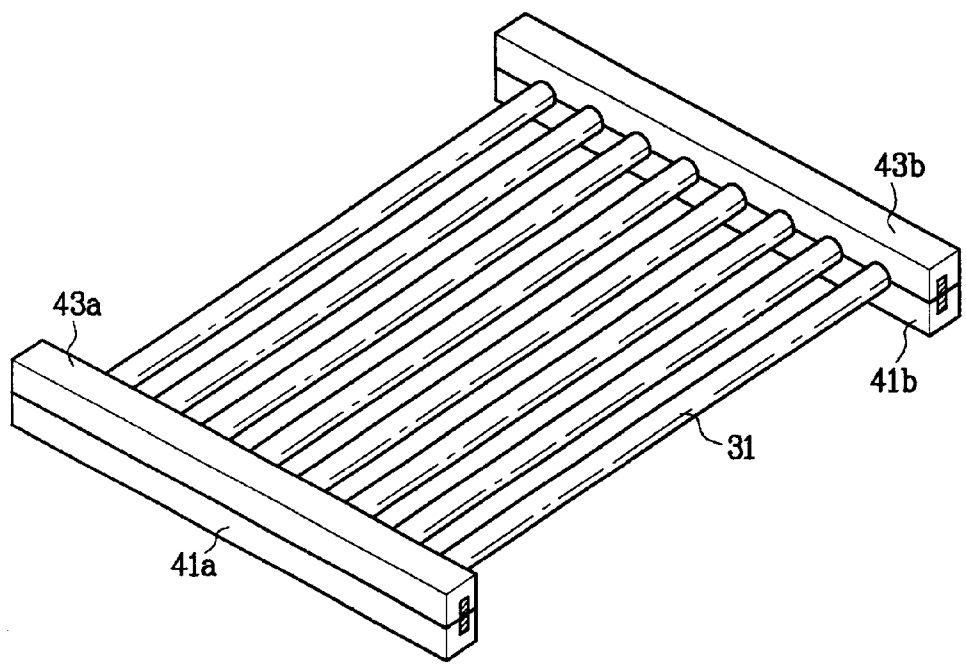
FIG. 5C shows a perspective view of an exemplary backlight device according to the present invention.

FIGS. 5A, 5B, and 5C show perspective views of exemplary backlight devices according to the present invention.

In FIG. 5A, a backlight device may include a plurality of light emitting lamps 31 having electrodes 33 and 33a. In FIG. 5B, a backlight device may include a plurality of electrodeless light emitting lamps 31a. In FIG. 5C, the backlight device firmly fastens and holds each of the light emitting lamps 31 (in FIG. 5A) or 31a (in FIG. 5B) along a length direction thereof, thereby constraining movement of each of the light emitting lamps 31 or 31a along the length direction. Accordingly, the ends of the light emitting lamps 31 or 31a do not pass through the first and second lower and upper holders 41a, 41b, 43a, and 43b.

Figure 6A:
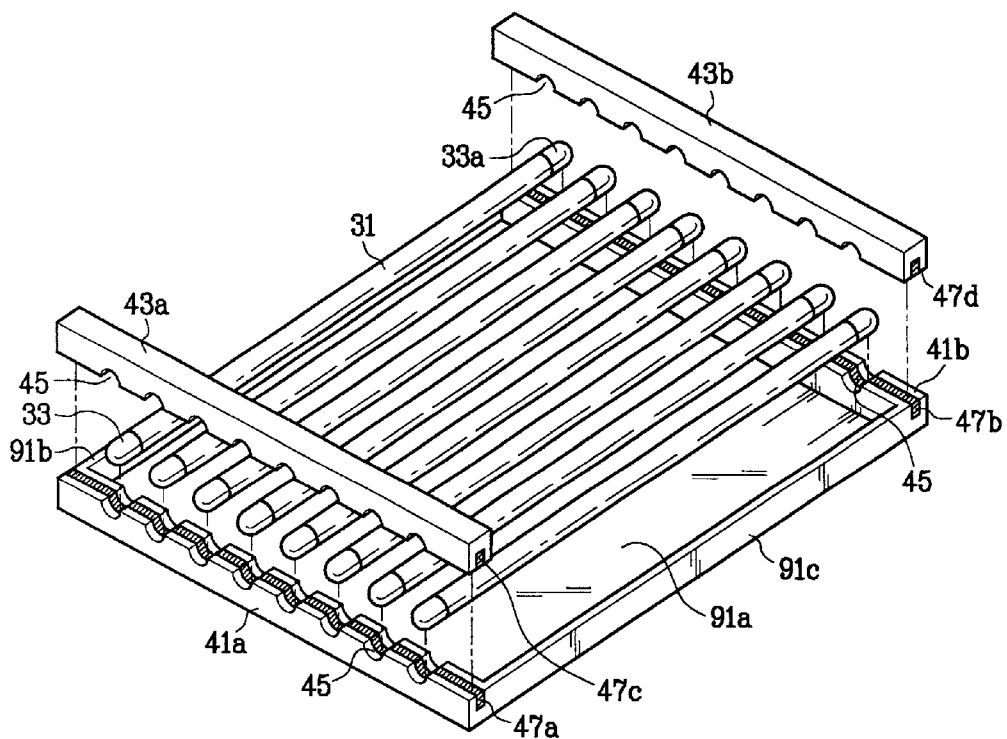
FIGS. 6A and 6B show perspective views of exemplary backlight devices according to the present invention.
Figure 6B:
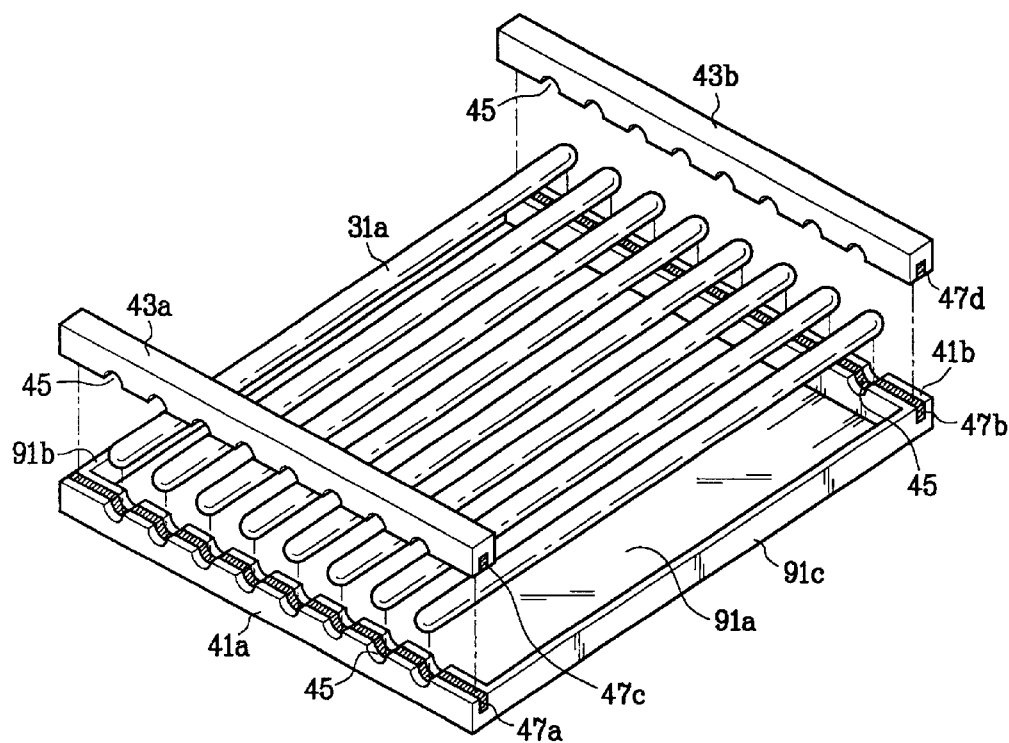

FIGS. 6A and 6B show perspective views of exemplary backlight devices according to the present invention. In FIG. 6A, a backlight device may include a plurality of light emitting lamps 31 each having electrodes 33 and 33a formed on outer surfaces at opposing end portions, first and second lower holders 41a and 41b spaced apart by a distance to conform to a length of the light emitting lamps 31 each having a plurality of recesses 45 formed in a surface thereof for receiving opposing ends of the plurality of light emitting lamps 31, lower supporting parts 91a, 91b, and 91c formed between the first and second lower holders 41a and 41b for supporting the first and second lower holders 41a and 41b, first and second upper holders 43a and 43b spaced apart by the distance associated with the first and the second lower holders 41a and 41b and including the recesses 45 associated with the first and the second lower holders 41a and 41b for fastening and holding the light emitting lamps 31 in association with the first and second lower holders 41a and 41b, and conductive layers 47a, 47b, 47c, and 47d formed on surfaces within the recesses 45 are formed in the holders 41a, 41b, 43a, and 43b, for supplying power to the electrodes 33 and 33a of the light emitting lamps 31.

In FIG. 6B, the conductive layers 47a, 47b, 47c, and 47d may be formed on opposing surfaces of the holders 41a, 41b, 43a, and 43b to serve as electrodes for providing power to the electrodeless light emitting lamps 31a. Accordingly, the exemplary backlight devices shown in FIGS. 6A and 6B firmly fasten and hold the light emitting lamps 31 or 31a by securing a supporting force between the holders 41a, 41b, 43a, and 43b that include the conductive layers 47a, 47b, 47c, and 47d for supplying power to the light emitting lamps 31 or 31a.

While the exemplary backlight devices shown in FIGS. 4A–4C and 5A–5C have the first lower holder 41a and the second lower holder 41b separated by a distance, the exemplary backlight devices shown in FIGS. 6A and 6B have the lower supporting parts 91a, 91b, and 91c in a space defined by the first lower holder 41a and the second lower holder 41b and at sides thereof, thereby integrating the first and second lower holders 41a, and 41b and the lower supporting parts 91a, 91b, and 91c. Moreover, inside surfaces of the first and second lower holders 41a, and 41b and the lower supporting parts 91a, 91b, and 91c may be formed of a material having an excellent light reflective capability to serve as a reflective plate, or a reflective material may be coated on the inside surfaces of the first and second lower holders 41a, and 41b and the lower supporting parts 91a, 91b, and 91c for focusing light emitted from the light emitting lamps 31 or 31a toward the LCD panel.

Figure 7A:
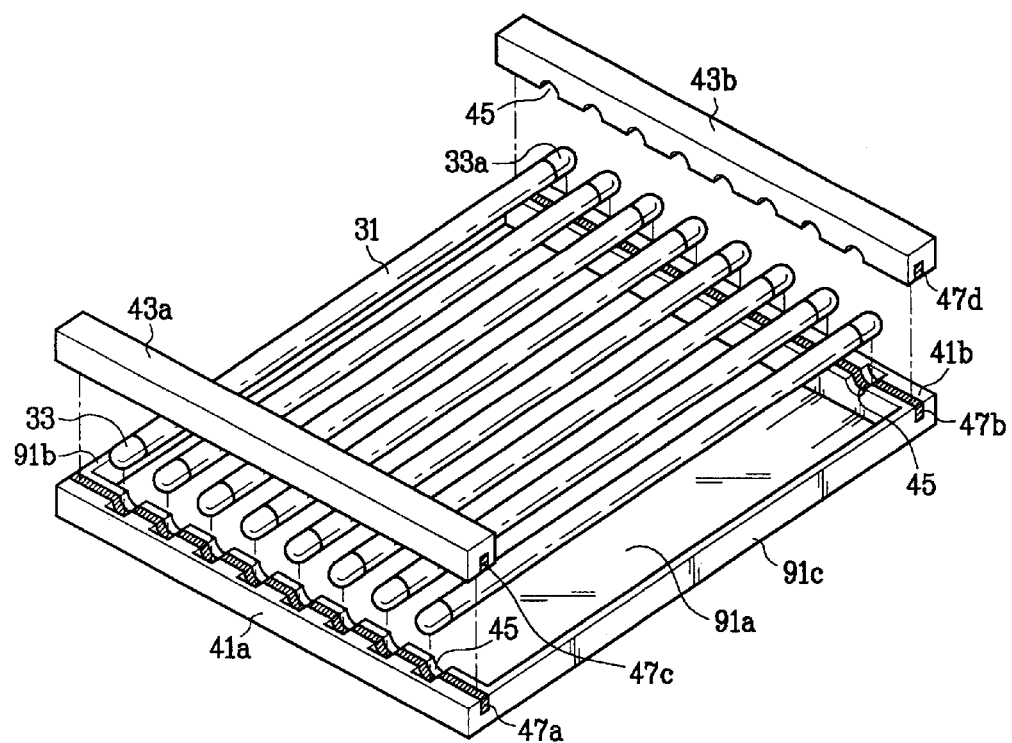
FIGS. 7A and 7B show perspective views of exemplary backlight devices according to the present invention.
Figure 7B:
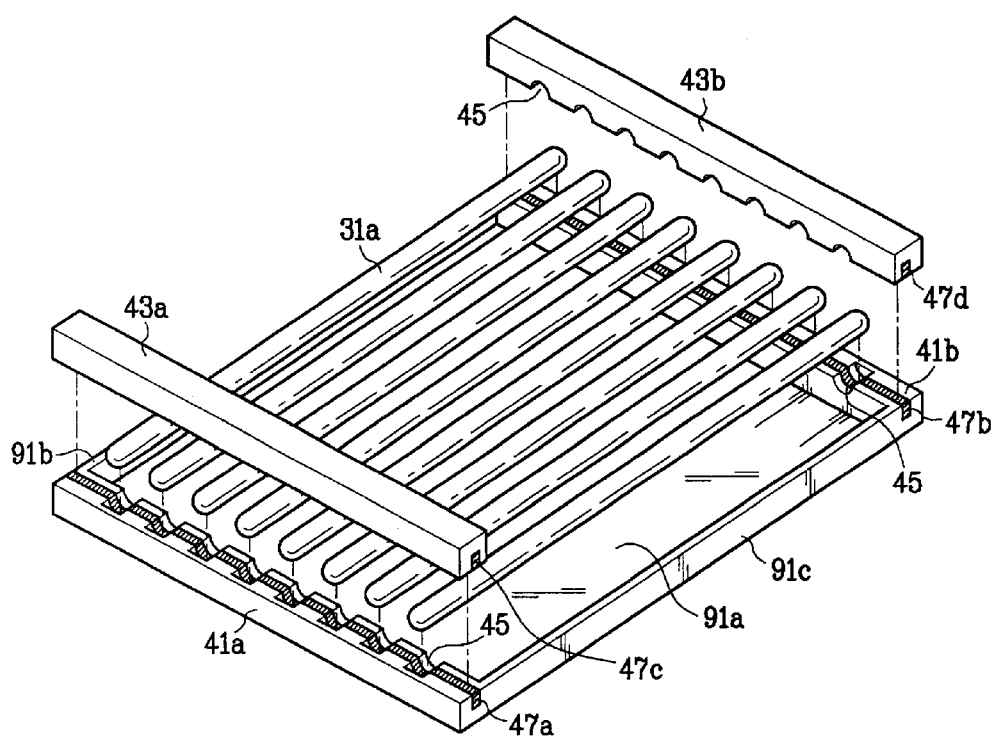

FIGS. 7A and 7B show perspective views of exemplary backlight devices according to the present invention, wherein FIG. 7A shows an exemplary backlight device that includes light emitting lamps 31 each having electrodes 33 and 33a formed on outer surfaces at opposing end portions, and FIG. 7B illustrates another exemplary backlight device that includes electrodeless light emitting lamps 31a.

The exemplary backlight devices shown in FIGS. 7A and 7B firmly fasten and hold the light emitting lamps 31 (in FIG. 7A) or 31a (in FIG. 7B) along a length direction thereof, thereby constraining movement of each of the light emitting lamps 31 or 31a along the length direction. Accordingly, the ends of the light emitting lamps 31 or 31a do not pass through the first and second lower and upper holders 41a, 41b, 43a, and 43b.

Figure 8A:
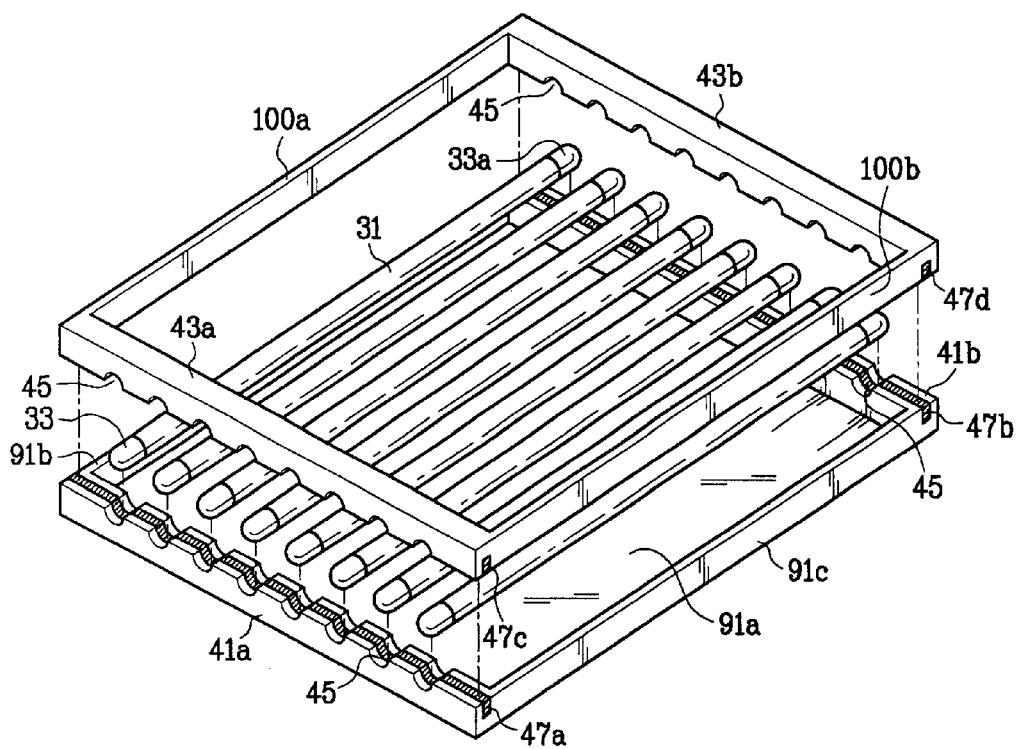
FIGS. 8A and 8B show perspective views of exemplary backlight devices according to the present invention; and, FIGS. 9A and 9B show perspective views of exemplary backlight devices according to the present invention.
Figure 8B:
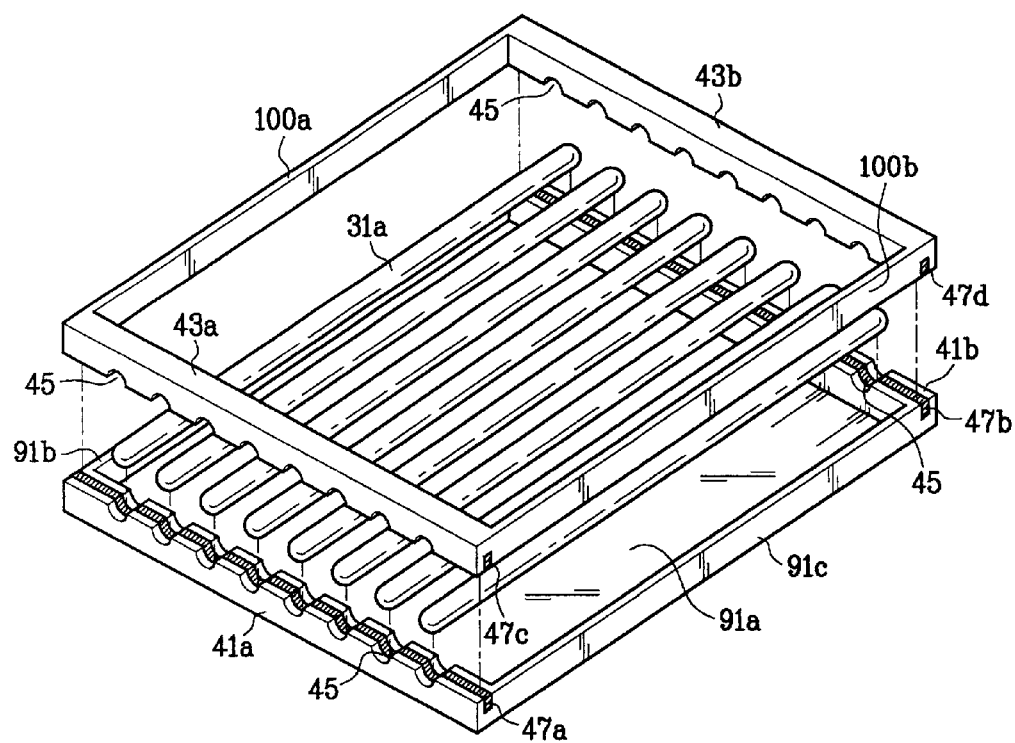

FIGS. 8A and 8B show perspective views of exemplary backlight devices according to the present invention. FIG. 8A shows a perspective view of an exemplary backlight device that is identical to the exemplary backlight device shown in FIG. 6A, except that upper supporting parts 100a and 100b are included for supporting the first and second upper holders 43a and 43b. FIG. 8B shows a perspective view of an exemplary backlight device that is identical to the exemplary backlight device shown in FIG. 6B, except that upper supporting parts 100a and 100b are included for supporting the first and second upper holders 43a and 43b.

In FIG. 8A, the upper supporting parts 100a and 100b are connected to opposing sides of the first and second upper holders 43a and 43b within a range such that the light emitted from the light emitting lamp 31 to the LCD panel is not cut off, thereby firmly fastening and holding the light emitting lamps 31.

In FIG. 8B, the upper supporting parts 100a and 100b are connected to opposing sides of the first and second upper holders 43a and 43b within a range such that the light emitted from the light emitting lamp 31a to the LCD panel is not cut off, thereby firmly fastening and holding the light emitting lamps 31a.

Figure 9A:
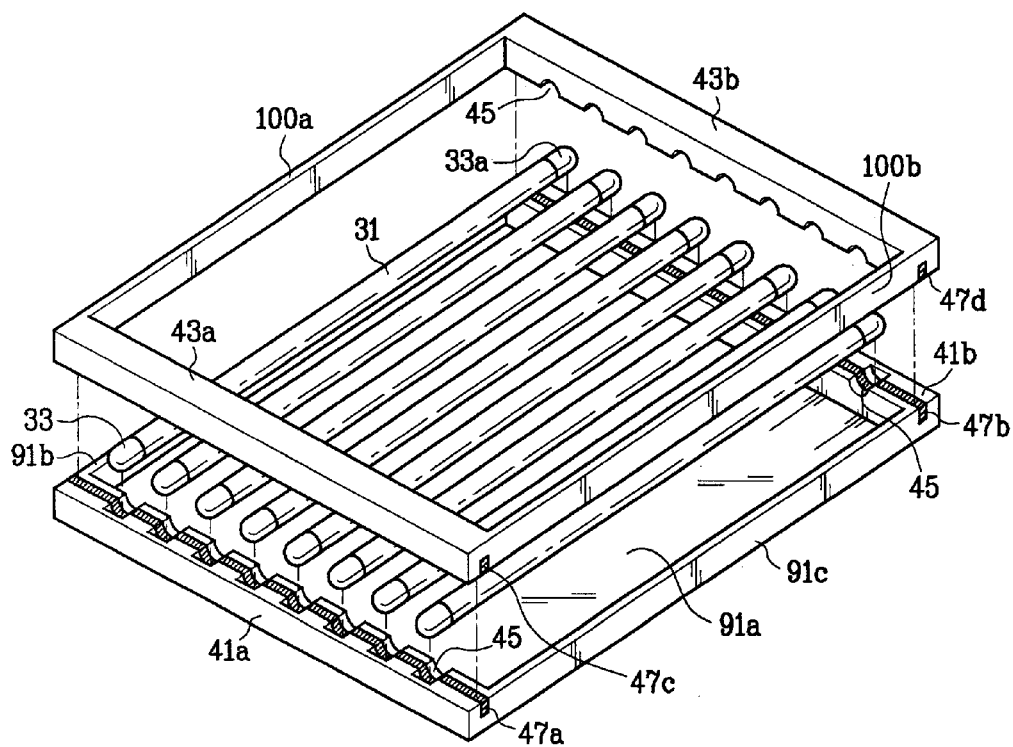
Figure 9B:
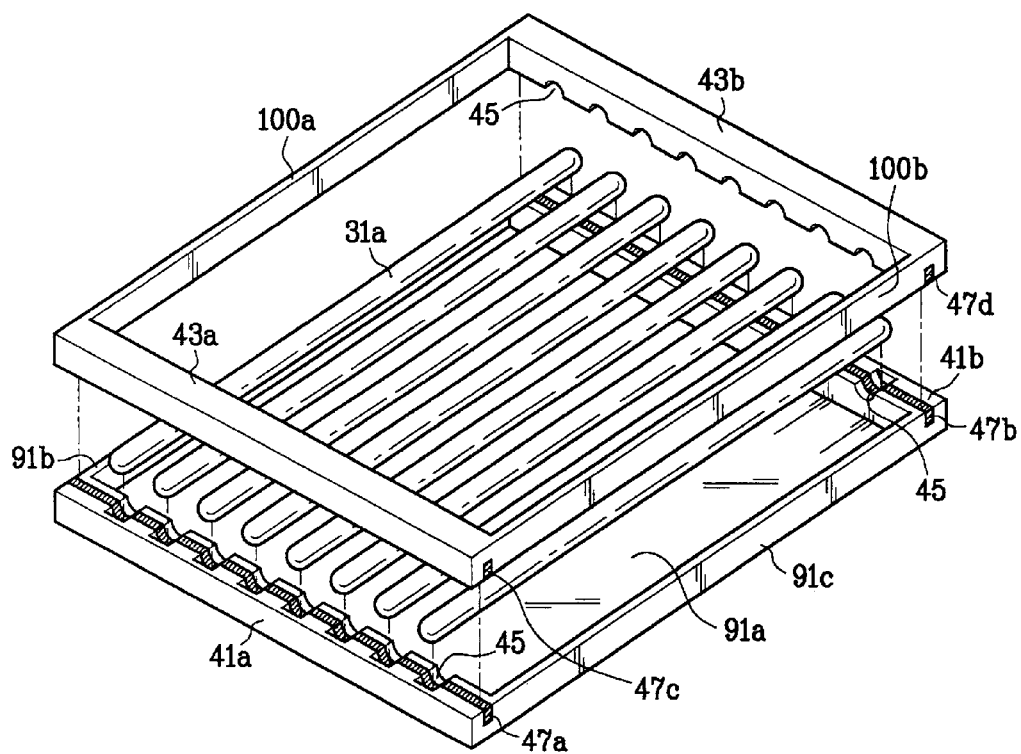

FIGS. 9A and 9B show perspective views of exemplary backlight devices according to the present invention. FIG. 9A shows an exemplary backlight device that includes light emitting lamps 31 each having electrodes 33 and 33a formed on outer surfaces at opposing end portions at both ends thereof, and FIG. 9B shows an exemplary backlight device that includes electrodeless light emitting lamps 31a.

The exemplary backlight devices shown in FIGS. 9A and 9B firmly fasten and hold the light emitting lamps 31 or 31a along a length direction thereof, thereby constraining movement of each of the light emitting lamps 31 or 31a along the length direction. Accordingly, the ends of the light emitting lamps 31 or 31a do not pass through the first and second upper and lower holders 41a, 41b, 43a, and 43b.

It will be apparent to those skilled in the art that various modifications and variations can be made in the backlight devices of the present invention without departing from the spirit or scope of the invention. Thus, it is intended that the present invention cover the modifications and variations of this invention provided they come within the scope of the appended claims and their equivalents.

What is claimed is:

1. A backlight device, comprising:
   a plurality of light emitting lamps;
   a plurality of upper and lower holders each having a plurality of recesses for receiving the plurality of light emitting lamps;
   a plurality of conductive layers for supplying power to the light emitting lamps; and
   light diffusion means disposed over the plurality of upper holders.

2. The device according to claim 1, wherein the plurality of light emitting lamps each have electrodes formed on outer surfaces at opposing end portions.

3. The device according to claim 1, wherein the plurality of light emitting lamps are electrodeless lamps.

4. The device according to claim 1, wherein the plurality of upper holders are detachable from the plurality of lower holders.

5. The device according to claim 1, wherein the plurality of recesses have an inner diameter approximately equal to an outer diameter of the plurality of light emitting lamps.

6. The device according to claim 1, wherein each of the plurality of conductive layers are formed on opposing surfaces of each of the plurality of upper and lower holders.

7. A backlight device, comprising:
- a plurality of light emitting lamps, each of the lamps having a first length corresponding to opposing end portions of the light emitting lamps;
- a plurality of lower holders arranged at a first distance away from each other corresponding to approximately the first length, each of the plurality of lower holders having a plurality of recesses for receiving lower surfaces of the opposing end portions of the plurality of light emitting lamps;
- a plurality of upper holders arranged at the first distance away from each other, each of the plurality of upper holders having a plurality of recesses for receiving upper surfaces of the opposing end portions of the plurality of light emitting lamps; and
- a plurality of conductive layers formed on opposing surfaces of each of the plurality of lower and upper holders for supplying power to the plurality of light emitting lamps.

8. The device according to claim 7, wherein the plurality of light emitting lamps each have electrodes formed on outer surfaces at the opposing end portions.

9. The device according to claim 7, wherein the light emitting lamps are electrodeless lamps.

10. The device according to claim 7, wherein the plurality of conductive layers are formed within the plurality of recesses.

11. The device according to claim 7, wherein each of the plurality of recesses pass through each of the plurality of lower and upper holders.

12. The device according to claim 7, wherein each of the plurality of recesses partially pass through an outside portion of each of the plurality of lower holders.

13. The device according to claim 7, wherein the plurality of conductive layers are formed of a conductive material within a longitudinal groove in each of the plurality of lower and upper holders.

14. The device according to claim 13, further comprising light diffusion means disposed over the plurality of upper holders.

15. A backlight device, comprising:
- a plurality of light emitting lamps, each of the lamps having a first length corresponding to opposing end portions of the light emitting lamps;
- a plurality of lower holders arranged at a first distance away from each other corresponding to approximately the first length, each of the plurality of lower holders having a plurality of recesses for receiving lower surfaces of the opposing end portions of the plurality of light emitting lamps;
- a plurality of lower supporting parts formed between the plurality of lower holders for supporting the plurality of lower holders;
- a plurality of upper holders arranged at the first distance away from each other, each of the plurality of upper holders having a plurality of recesses for receiving upper surfaces of the opposing end portions of the plurality of light emitting lamps; and
- a plurality of conductive layers formed on opposing surfaces of each of the plurality of lower and upper holders for supplying power to the plurality of light emitting lamps.

16. The device according to claim 15, wherein the plurality of light emitting lamps each have electrodes formed on outer surfaces at the opposing end portions.

17. The device according to claim 15, wherein the light emitting lamps are electrodeless lamps.

18. The device according to claim 15, wherein each of the plurality of recesses pass through each of the plurality of lower and upper holders.

19. The device according to claim 15, wherein each of the plurality of recesses partially pass through an outside portion of each of the plurality of lower holders.

20. The device according to claim 15, wherein the plurality of conductive layers are formed of a conductive material within a longitudinal groove in the plurality of lower and upper holders.

21. The device according to claim 20, further comprising light diffusion means over the plurality of upper holders.

22. The device according to claim 21, wherein the plurality of lower supporting parts are formed of a light reflective material.

23. The device according to claim 21, wherein inside surfaces of the plurality of lower supporting parts are coated with a light reflective material.

24. The device according to claim 15, further comprising a plurality of upper supporting parts at opposing ends of the plurality of upper holders for supporting the plurality of upper holders.

* * * * *